(12) United States Patent
Jeong

(10) Patent No.: US 11,966,962 B2
(45) Date of Patent: Apr. 23, 2024

(54) ARTIFICIAL INTELLIGENCE-BASED CURATING METHOD AND DEVICE FOR PERFORMING THE SAME

(71) Applicant: ARTISTY INC., Seoul (KR)

(72) Inventor: Hoon Jeong, Gyeonggi-do (KR)

(73) Assignee: ARTISTY INC., Seoul (KR)

( * ) Notice: Subject to any disclaimer, the term of this patent is extended or adjusted under 35 U.S.C. 154(b) by 310 days.

(21) Appl. No.: 17/597,895

(22) PCT Filed: May 11, 2020

(86) PCT No.: PCT/KR2020/006177
§ 371 (c)(1),
(2) Date: Jan. 28, 2022

(87) PCT Pub. No.: WO2020/242089
PCT Pub. Date: Dec. 3, 2020

(65) Prior Publication Data
US 2022/0343390 A1    Oct. 27, 2022

(30) Foreign Application Priority Data
May 30, 2019  (KR) .................. 10-2019-0063903

(51) Int. Cl.
*G06Q 30/00*     (2023.01)
*G06Q 30/0601*   (2023.01)

(52) U.S. Cl.
CPC .................. *G06Q 30/0631* (2013.01)

(58) Field of Classification Search
CPC ............................................. G06Q 30/06–08
See application file for complete search history.

(56) References Cited

U.S. PATENT DOCUMENTS

| | | | | |
|---|---|---|---|---|
| 10,290,036 | B1* | 5/2019 | Gella | G06Q 30/0623 |
| 11,176,598 | B2* | 11/2021 | D'Souza | G06N 3/04 |
| 2009/0259567 | A1* | 10/2009 | Watts | G06Q 30/0601 |
| | | | | 705/26.1 |
| 2015/0228002 | A1* | 8/2015 | Berger | G06Q 30/0627 |
| | | | | 705/26.63 |
| 2018/0218429 | A1* | 8/2018 | Guo | G06N 3/045 |

FOREIGN PATENT DOCUMENTS

| | | |
|---|---|---|
| KR | 10-0961782 B1 | 6/2010 |
| KR | 10-2018-0002944 A | 1/2018 |
| KR | 10-2018-0089653 A | 8/2018 |
| KR | 10-2019-0047867 A | 5/2019 |

OTHER PUBLICATIONS

Machine Translation of KR 2018/0089653 specification downloaded from espacenet (Year: 2018).*
International Search Report of PCT/KR2020/006177 dated Nov. 11, 2020.

* cited by examiner

*Primary Examiner* — Ethan D Civan
(74) *Attorney, Agent, or Firm* — Mark T. Vogelbacker; Eckert Seamans Cherin & Mellott, LLC

(57) ABSTRACT

An artificial intelligence-based curating method and a device for performing the same may include operations of allowing an artificial intelligence curating device to receive purchaser information, allowing the artificial intelligence curating device to determine recommended painting information on the basis of the purchaser information, and allowing the artificial intelligence curating device to transmit candidate sale painting information to a user device of a purchaser on the basis of the recommended painting information.

18 Claims, 10 Drawing Sheets

FIG. 4

ARTIFICIAL INTELLIGENCE-BASED CURATING METHOD AND DEVICE FOR PERFORMING THE SAME

CROSS-REFERENCE TO RELATED APPLICATION

This application is a U.S. National Phase Application of International Application Number PCT/KR2020/006177, filed May 11, 2020, which claims priority to and the benefit of Korean Patent Application No. 10-2019-0063903, filed on May 30, 2019, the disclosures of which are incorporated herein by reference in their entirety.

BACKGROUND

1. Field

The present invention relates to an artificial intelligence-based curating method and a device for performing the same, and more particularly, to a method and device for more accurately providing a painting that meets a purchaser's preference and conditions on the basis of machine learning.

2. Discussion of Related Art

In modern society, humans expect machines to communicate with them beyond simply giving their instructions to the machines and also expect machines to understand their intentions, share knowledge, judgments, experiences, and even emotions, and interact with them. Affective computing, one of the important research fields of artificial intelligence created for these human needs, is a field that develops systems or devices that recognize, understand, process, and stimulate human emotions so that humans and machines can emotionally interact.

In general, the realm of art was thought to be a realm unique to humans, but recently, various attempts have been made so that machines equipped with artificial intelligence engines can create, understand, and evaluate works of art, and some progressive artists are directly involved in such research. Artists are now trying to use science and technology more actively for the advancement of art in line with the changing times.

Such artificial intelligence can also be used to search for and recommend artworks that purchasers want. Therefore, there is a need for development and research on a method for providing an artwork suitable for a purchaser's preference.

SUMMARY

The objects of the present invention are to solve all of the above problems.

Also, another object of the present invention is to recommend an artwork suitable for a purchaser's preference on the basis of artificial intelligence.

Also, another object of the present invention is to provide a service for selling and purchasing artworks in a reverse auction method between a purchaser and an artist who is highly related to an artwork that is suitable for the purchaser's preference and that is selected based on artificial intelligence.

A representative configuration of the present invention for achieving the above objects is as follows.

According to an aspect of the present invention, there is provided an artificial intelligence-based curating method including operations of allowing an artificial intelligence curating device to receive purchaser information, allowing the artificial intelligence curating device to determine recommended painting information on the basis of the purchaser information, and allowing the artificial intelligence curating device to transmit candidate sale painting information to a user device of a purchaser on the basis of the recommended painting information.

According to another aspect of the present invention, there is provided an artificial intelligence-based curating device including a communication unit configured to receive purchaser information and a processor operatively connected to the communication unit, wherein the processor is implemented to receive the purchaser information, determine recommended painting information on the basis of the purchaser information, and transmit candidate sale painting information to a user device of a purchaser on the basis of the recommended painting information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 3 to 5 are conceptual diagrams illustrating a method of providing information on an artist's paintings available for sale according to an embodiment of the present invention;

DETAILED DESCRIPTION OF EXEMPLARY EMBODIMENTS

Figure 1:
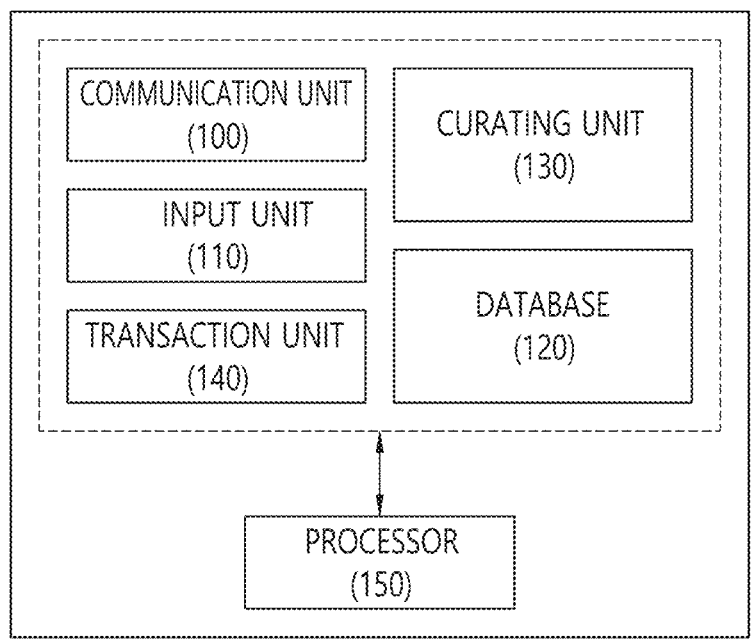
FIG. 1 is a conceptual diagram showing an artificial intelligence curating device according to an embodiment of the present invention.

In the following detailed description of the present invention, references are made to the accompanying drawings that show, by way of illustration, specific embodiments in which the invention may be practiced. These embodiments are described in sufficient detail to enable those skilled in the art to practice the present invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

FIG. 1 is a conceptual diagram showing an artificial intelligence curating device according to an embodiment of the present invention.

In FIG. 1, an artificial intelligence curating device for providing a curating service based on artificial intelligence is disclosed.

Referring to FIG. 1, the artificial intelligence curating device may include a communication unit 100, an input unit 110, a database 120, a curating unit 130, a transaction unit 140, and a processor 150. The transaction unit 140 may be implemented as a separate element rather than being included in the artificial intelligence curating device. Also, this embodiment is encompassed within the scope of the present invention. Hereinafter, a purchaser refers to a person who wants to purchase a painting, and an artist generally refers to a person who paints a painting and wants to sell the painting. However, an artist may be interpreted to include a seller who wants to sell an artist's painting.

The input unit 110 may be implemented for an input for purchaser information. The purchaser information may include information associated with a preference for a painting desired by a purchaser. The input unit 110 may be implemented as an artificial intelligence-based conversation module such as a chatbot and may receive information about a painting desired by a purchaser through a conversation.

The database 120 may be implemented to store painting information and/or purchaser information. For example, the database 120 may be implemented to store painting information, purchaser information, matching information between the painting information and the purchaser information, etc. Based on the purchaser information and painting information stored in the database 120, painting information matched to purchaser information determined by the curating unit 130 may be determined and provided to the purchaser.

Also, the painting information, the purchaser information, the matching information between the painting information and the purchaser information and the like stored in the database 120 may be utilized to learn the painting information matched to the purchaser information.

The curating unit 130 may be implemented to determine the painting information matched to the purchaser information. The curating unit 130 may search for painting information (e.g., a painting image, an artist, etc.) matched to purchaser preference information included in the purchaser information through artificial intelligence-based machine learning and provide recommended painting information. The recommended painting information may include recommended painting image information, recommended artist information, etc. A learning method for the curating unit 130 to determine recommended painting information matched to purchaser information will be described below.

Also, the curating unit 130 may call an artist on the basis of the recommended artist information. The curating unit 130 may request that candidate sale painting information (artist) be reversely offered to an artist corresponding to the recommended artist information. The artist may transmit the candidate sale painting information (artist) to the curating unit 130 through a user device. The candidate sale painting information (artist) may be information selected by the artist. The candidate sale painting information (artist) may include information on a candidate sale painting image, a candidate sale painting price, a candidate sales commentary, a candidate sales artist history, etc. The candidate sale painting information (artist) may be provided to the purchaser's user device.

In addition, the curating unit 130 may generate candidate sale painting information (artificial intelligence) on the basis of the recommended painting image information and provide the generated candidate sale painting information to the purchaser's user device.

That is, the curating unit 130 may provide the candidate sale painting information (artist) offered by the artist determined based on the recommended artist information and the candidate sale painting information (artificial intelligence) offered based on the recommended painting image information to the purchaser's user device. The purchaser may determine whether to make a purchase on the basis of at least one piece of candidate sale painting information provided through the user device.

The curating unit 130 may perform artificial intelligence-based learning, which will be described later, by itself or may utilize a learning result performed based on an artificial intelligence server that is implemented separately and externally.

The transaction unit 140 may be implemented for a transaction between an artist and a seller when a purchaser intends to purchase a painting based on the candidate sale painting information. For example, the transaction may be made in a reverse auction method in which a plurality of artists related to a candidate sale painting offer prices for the candidate sale painting and the purchaser decides to accept the prices offered for the sale painting.

Also, the artificial intelligence curating device may include a communication unit 100 for receiving information (e.g., purchaser information) from an external device (e.g., the user device of the purchaser or the artist).

The processor 150 may be implemented to control the operations of the communication unit 100, the input unit 110, the database 120, the curating unit 130, and the transaction unit 140. The processor 150 may be operatively connected to each element.

Figure 2:
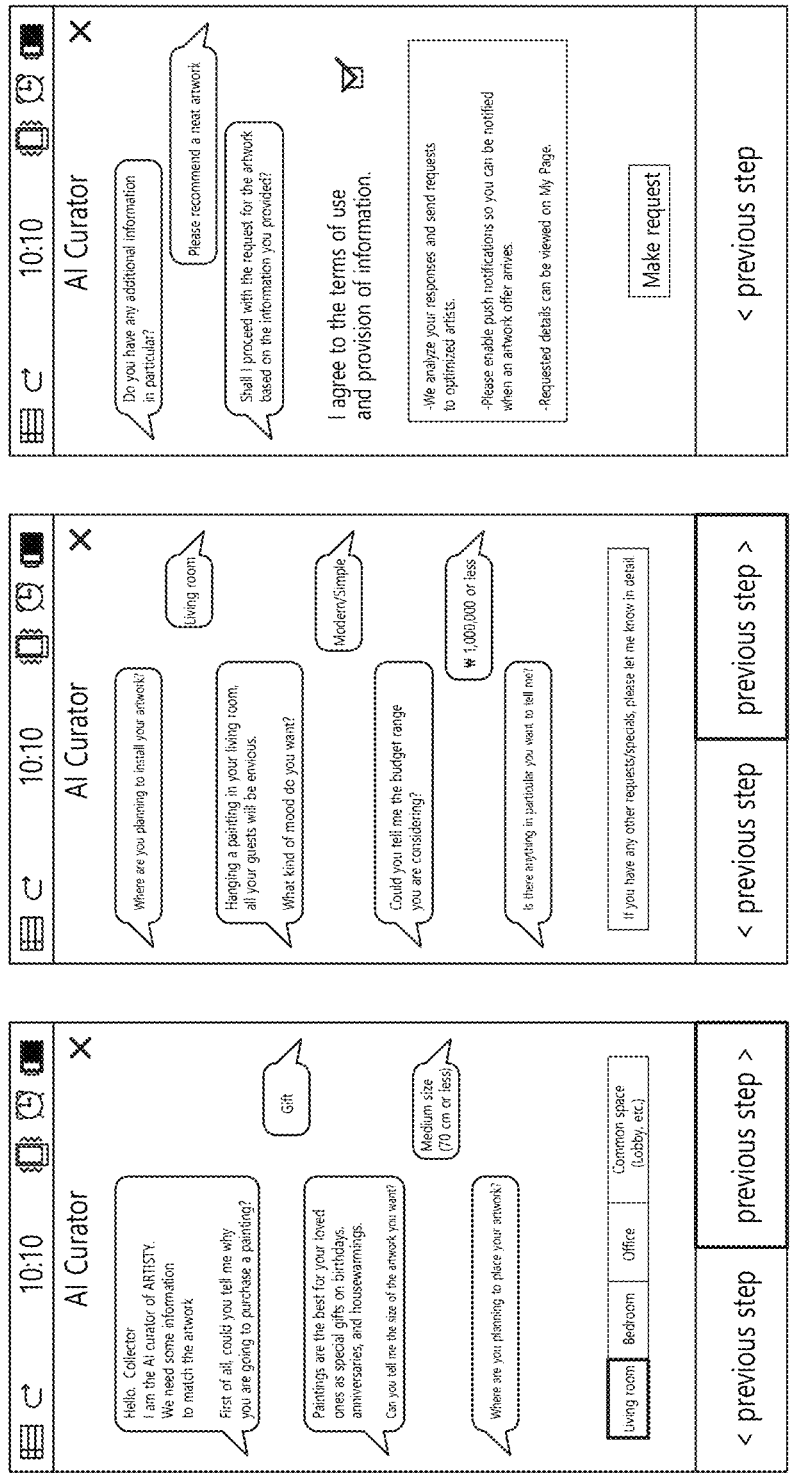
FIG. 2 is a conceptual diagram showing an input unit according to an embodiment of the present invention.

FIG. 2 is a conceptual diagram showing an input unit according to an embodiment of the present invention.

In FIG. 2, a process in which the input unit receives purchaser information on the basis of a chatbot is disclosed.

Referring to FIG. 2, the purchaser information may be acquired by asking a purchaser about a painting purpose, a painting size, a painting installation location, a painting mood, a painting price, etc. and allowing the purchaser to answer the question on the basis of the chatbot.

Based on the purchaser's answer delivered through the chatbot, a cluster may extract recommended painting information on the basis of a cluster group, which will be described below. When the number of common cluster groups of a recommended painting in the recommended painting information extracted through the cluster is less than or equal to a threshold, additional questions may be asked to more accurately understand the purchaser's preference through the chatbot. Thus, by allowing the number of common cluster groups of the recommended painting in the recommended painting information extracted through the cluster to exceed the threshold, it is possible to generate more accurate recommended painting information.

Figure 3:
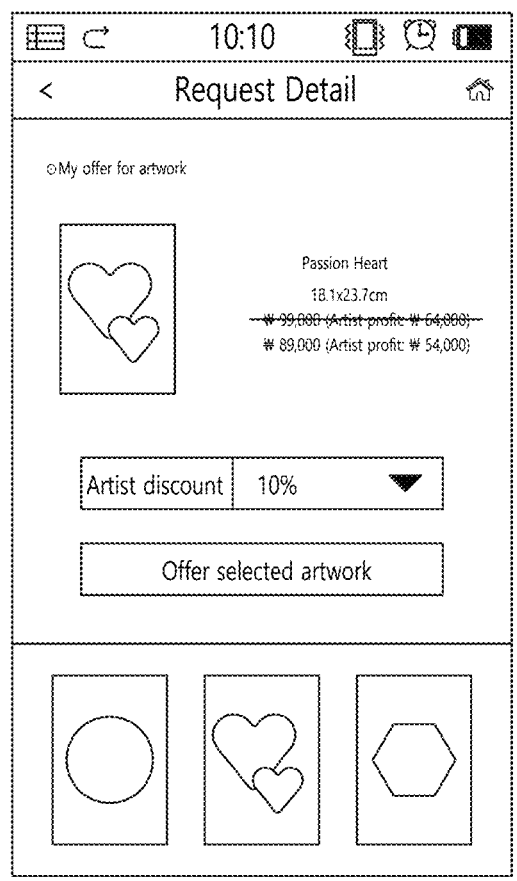
Figure 4:
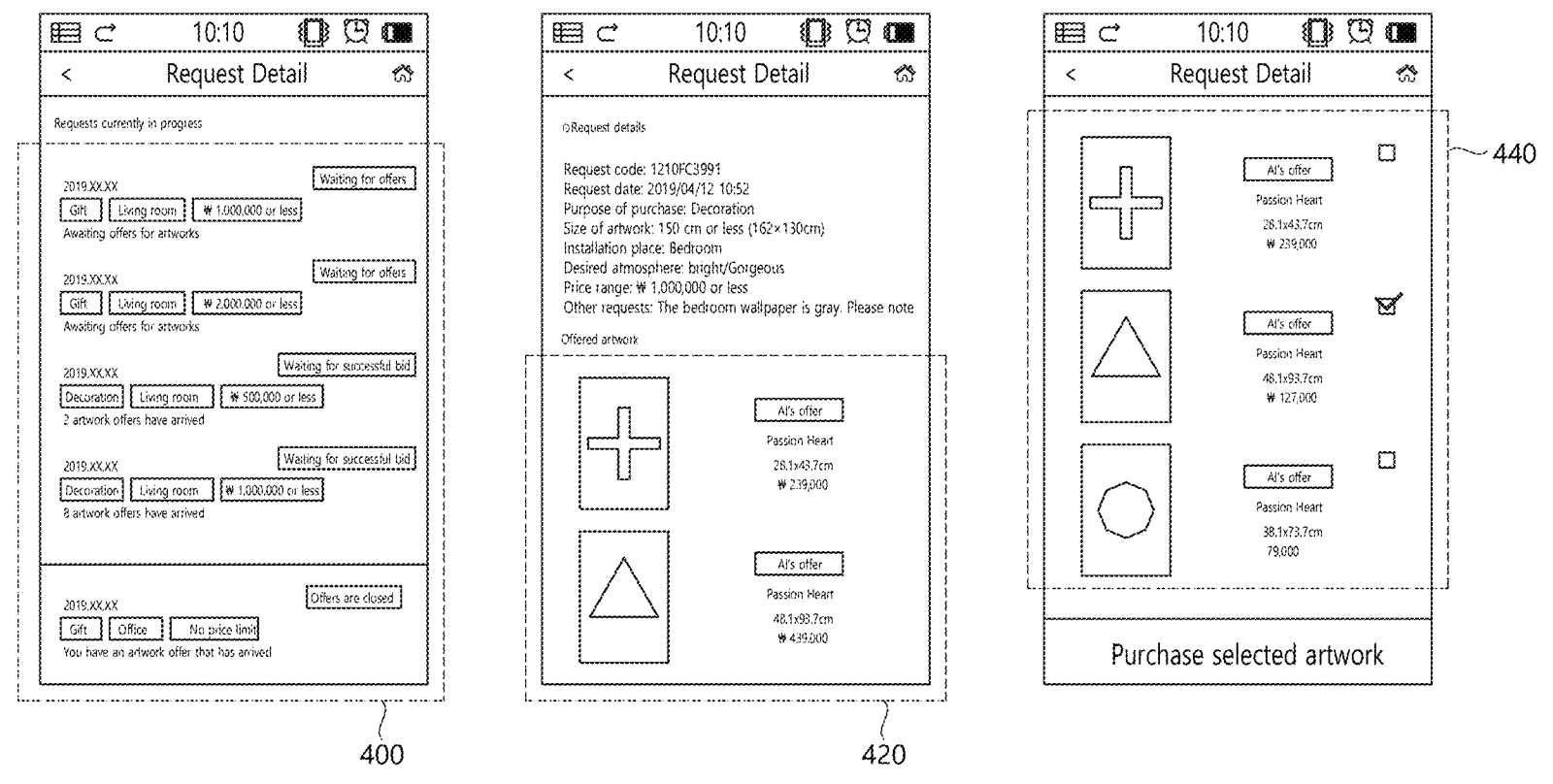
Figure 5:
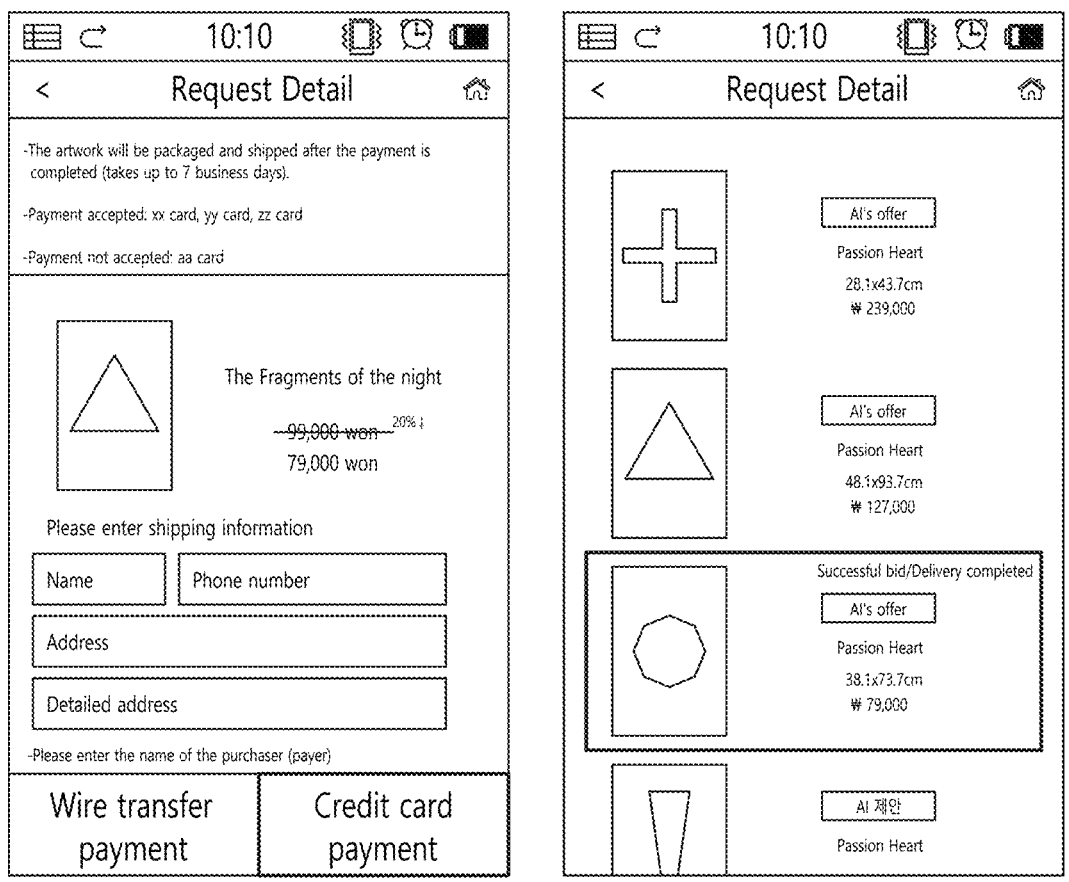

FIGS. 3 to 5 are conceptual diagrams illustrating a method of providing information on an artist's paintings available for sale according to an embodiment of the present invention.

In FIGS. 3 to 5, a method for an artist to transmit sellable painting information to a curating unit through a user device is disclosed.

As described above, the curating unit may determine recommended painting information including recommended painting image information and recommended artist information. The candidate sale painting information (artist) may be determined based on the recommended artist information, and the candidate sale painting information (artificial intelligence) may be determined based on the recommended painting information.

In FIG. 3, a screen in which an artist selects a painting he or she wants to offer to the purchaser from among registered artworks through a user device is disclosed. The artist may be selected as a recommended artist by the curating unit, and the curating unit may generate the candidate sale painting information (artist) after the artist is selected as the recommended artist.

In FIG. 4, a method of allowing the purchaser to request an artwork and receive the candidate sale painting information (artist) and/or the candidate sale painting information (artificial intelligence) is disclosed.

The purchaser's candidate sale painting request list 400 based on the purchaser information may be listed over time and provided. In the candidate sale painting request list 400, the status of each candidate sale painting request (waiting for offer, waiting for successful bid, ending of offer, etc.) may be displayed.

When a candidate sale painting request is selected, candidate sale painting information (artist) 440 and/or candidate sale painting information (artificial intelligence) 420 corresponding to a painting request history and the candidate sale painting request are provided as the purchaser information. The purchaser may select a final purchase painting to be purchased on the basis of the candidate sale painting information (artist) 440 and/or the candidate sale painting information (artificial intelligence) 420.

In FIG. 5, a payment procedure for the final purchase painting is disclosed. The purchaser may input a delivery address for receiving the final purchase painting and may proceed with the payment procedure using a payment method. The painting for which the payment is made may be provided to the delivery address input by the purchaser.

Figure 6:
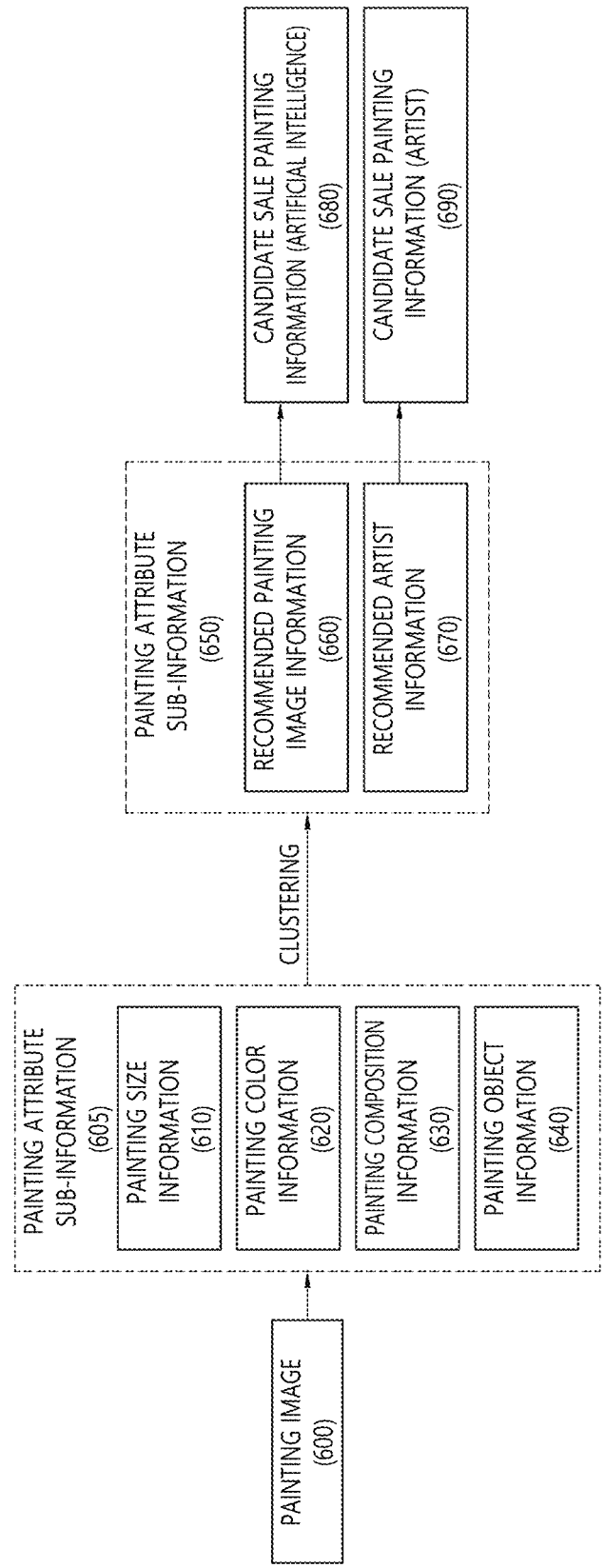
FIG. 6 is a conceptual diagram showing a method for a curating unit to determine recommended painting information based on artificial intelligence according to an embodiment of the present invention.

FIG. 6 is a conceptual diagram showing a method for a curating unit to determine recommended painting information based on artificial intelligence according to an embodiment of the present invention.

In FIG. 6, a method is disclosed in which the curating unit searches for painting information (e.g., a painting image, an artist, etc.) matched to purchaser preference information included in the purchaser information through artificial intelligence-based machine learning and provides recommended painting information.

Referring to FIG. 6, first, clustering may be performed on a painting image 600. When clustering is performed on the painting image 600, characteristics of the painting may be extracted, and a group of paintings having similar attributes may be generated.

According to an embodiment of the present invention, painting attribute information may include a plurality of pieces of painting attribute sub-information 605. The painting attribute sub-information 605 may include painting size information 610, painting color information 620, painting composition information 630, painting object information 640, etc.

The painting size information 610 may include information on the size of a painting.

The painting color information 620 may include information on colors used in a painting. The painting color information 620 may be determined by dividing the painting image into sub-regions, determining color information for the sub-regions of the painting image, and considering a weight for each region in the painting.

The painting composition information 630 may include information on the structure and composition of objects included in a painting. For example, the painting composition information 630 may include information on where polka dots are placed in a painting, where and at what size an object is placed in a painting, etc.

The painting object information 640 may include information on objects included in a painting. The objects included in the painting may be objects such as a person, an animal, or a plant.

A plurality of individual clusters for each of the plurality of pieces of painting attribute sub-information may be determined, and recommended painting information 650 may be determined by matching the purchaser information to the plurality of painting attribute sub-information on the basis of the plurality of individual clusters.

The recommended painting information 650 may include recommended painting image information 660 and recommended artist information 670. Candidate sale painting information (artificial intelligence) 680 may be determined based on the recommended painting image information 660, and candidate sale painting information (artist) 690 may be determined based on the recommended artist information 670.

Here, a method of extracting painting color information and painting composition information is disclosed according to an embodiment of the present invention.

Figure 7:
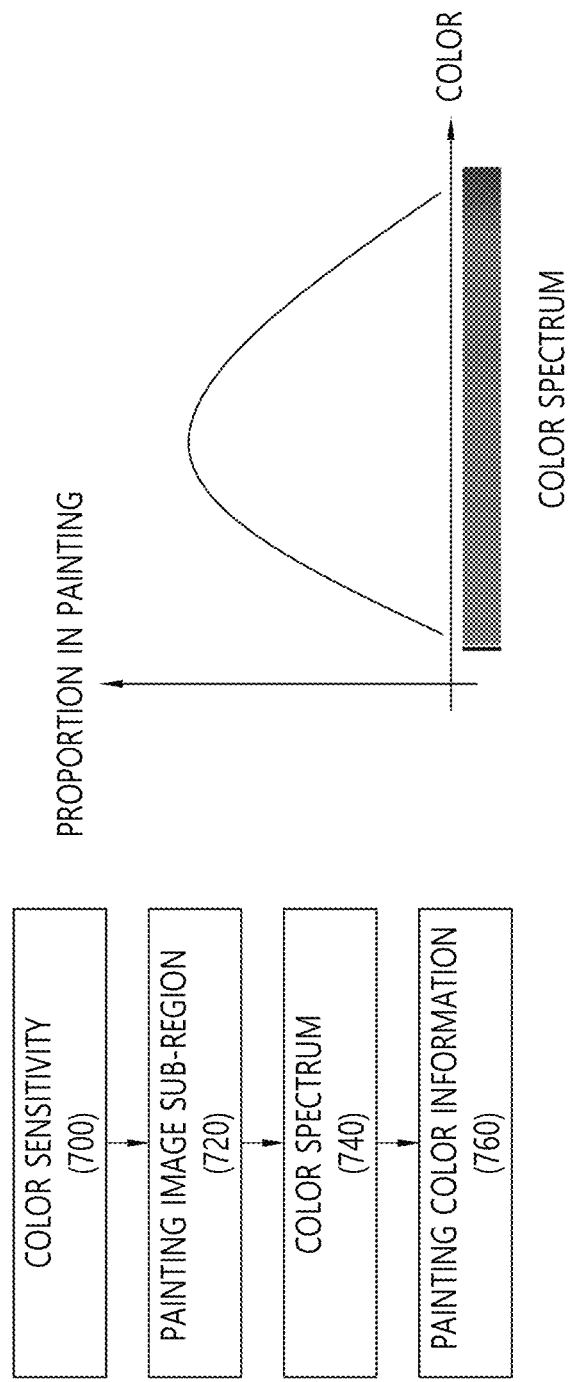
FIG. 7 is a conceptual diagram showing a method of extracting painting color information according to an embodiment of the present invention.

FIG. 7 is a conceptual diagram showing a method of extracting painting color information according to an embodiment of the present invention.

In FIG. 7, a method of extracting painting color information is disclosed.

Referring to FIG. 7, a color sensitivity 700 for extracting painting color information is set.

The color sensitivity 700 for extracting painting color information may be set based on the number of colors used in the painting, which is determined based on a reference color sensitivity.

When the number of colors used based on the reference color sensitivity is less than or equal to a threshold number, the color sensitivity 700 may be increased in consideration of the difference between the number of used colors and the threshold number. On the contrary, when the number of colors used based on the reference color sensitivity is greater than the threshold number, the color sensitivity 700 may be decreased in consideration of the difference between the number of used colors and the threshold number. Through this method, unnecessary division for extracting painting color information may not occur.

In order to extract painting color information from a painting, the painting may be divided into a plurality of painting image sub-regions 720.

The plurality of painting image sub-regions 720 may be determined through color determination based on the set color sensitivity. The division into the painting image sub-regions 720 may be performed based on the set color sensitivity. The color sensitivity is a sensitivity for recognizing whether colors are different from each other, and when the color sensitivity is relatively low, a relatively wide range of colors may be determined as a similar range of colors. On the other hand, when the color sensitivity is relatively high, a relatively narrow range of colors may be determined as a similar range of colors. For example, when the color sensitivity is relatively low, it may be determined that red and orange are similar colors, but when the color sensitivity is relatively high, it may be determined that red and orange are not similar colors.

The painting color information 760 is determined based on the colors, sizes, and positions of the plurality of painting image sub-regions 720 obtained through division based on the color sensitivity.

The color spectrum 740 of the painting may be generated in consideration of representative color information of each of the painting image sub-regions 720, center-based position information of each of the painting image sub-regions 720, and size information of each of the painting image sub-regions 720.

The representative color information of each of the plurality of painting image sub-regions 720 may include information on a color corresponding to a median or an average of a color range in the corresponding painting image sub-region 720.

The center-based position information of each of the plurality of painting image sub-regions 720 may be information on a distance between the center of the painting and the center of the painting image sub-region. As the distance between the center of the painting and the center of the painting image sub-region is shorter, the representative color of the painting image sub-region 720 may be set to occupy a relatively high proportion.

The image size information of each of the plurality of painting image sub-regions 720 may be information on the area occupied by the corresponding painting image sub-region 720 in the entire area of the painting. As the area occupied by the corresponding painting image sub-region in the entire of the painting is relatively high, the representative color of the painting image sub-region 720 may be set to occupy a relatively high proportion.

For example, it may be assumed that a painting image sub-region A is color a and a painting image sub-region B is color b. If the painting image sub-region A and the painting image sub-region B have the same center-based position information and the same image size information, the proportion of color a and the proportion of color B in the color spectrum may be the same.

However, when the painting image sub-region A is closer to the center of the painting than the painting image sub-region B, the proportion of color a may be relatively increased. Also, when the painting image sub-region A has a greater area than the painting image sub-region B, the proportion of color a may be relatively increased.

A first weight value of color in the color spectrum 740 increasing according to the center-based position information and a second weight value of color in the color spectrum 740 increasing according to the image size information may be adjusted later based on feedback from the purchaser. When the probability of selection of candidate sale painting information provided based on the recommended painting information determined by matching the purchaser information to the painting color information is less than or equal to a threshold value or when the probability of re-request for the candidate sale painting information is greater than or equal to a threshold value, the first weight value of color on the color spectrum 740 increasing according to the center-based position information and the second weight value of color on the color spectrum 740 increasing according to the image size information may be adjusted.

The painting color information 760 of the painting may be determined based on the color spectrum, and clustering may be performed on the painting on the basis of the painting color information 760.

Figure 8:
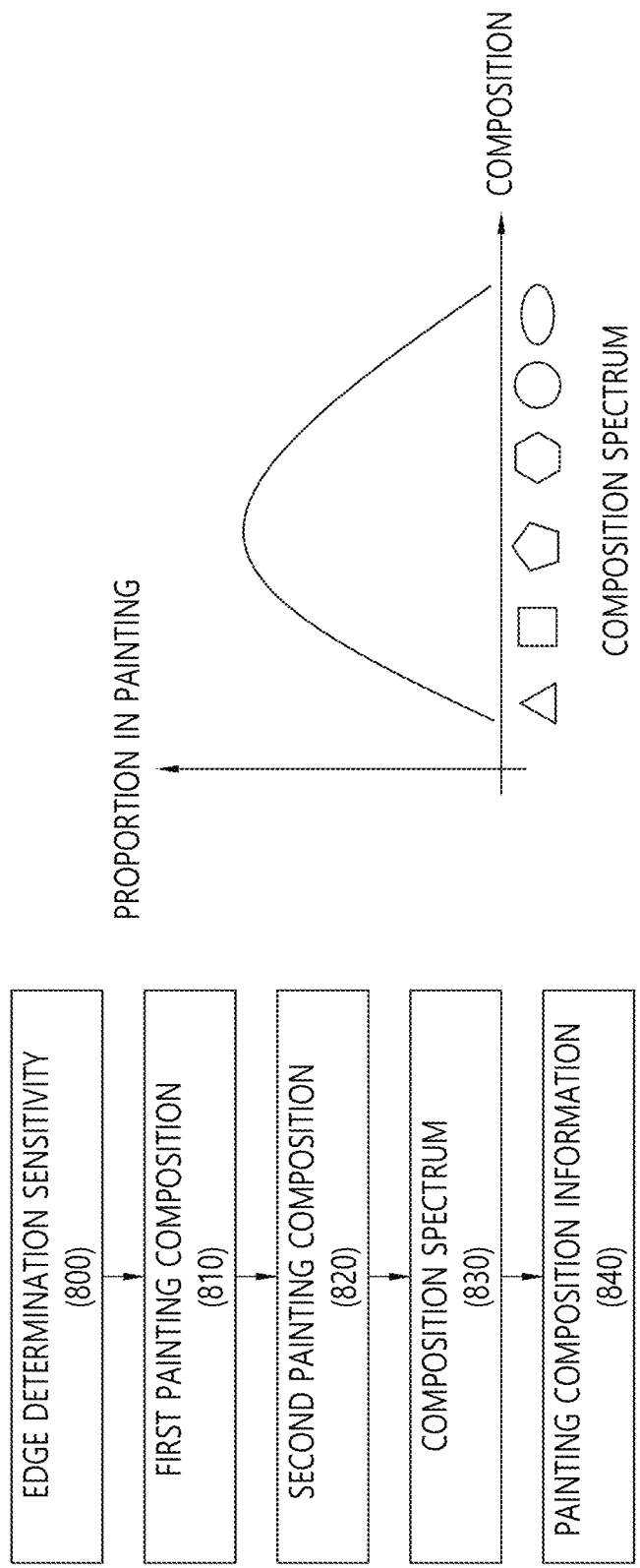
FIG. 8 is a conceptual diagram showing a method of extracting painting composition information according to an embodiment of the present invention.

FIG. 8 is a conceptual diagram showing a method of extracting painting composition information according to an embodiment of the present invention.

In FIG. 8, a method of acquiring painting composition information in a painting is disclosed.

Referring to FIG. 8, edge information in a painting may be extracted to determine the painting composition information. An edge determination sensitivity 800 may be preferentially determined to extract the edge information in the painting. For example, the edge determination sensitivity 800, which is a sensitivity on which of the lines included in a painting is determined as an edge, may be determined. As the edge determination sensitivity 800 becomes relatively high, relatively more detailed information may be acquired to determine a painting composition.

A first painting composition 810 is extracted through connection of main edges among edges extracted from the painting on the basis of the edge determination sensitivity 800.

When the extracted edge has connectivity and an internal region formed through connection has a first threshold percentage or more with respect to the entire area of the painting, the corresponding edge may be determined as a main edge. The main edge may form a first painting composition 810 in the painting.

Subsequently, when among edges other than the main edges, an internal region formed through connection has a second threshold percentage or more with respect to the entire area of the painting, a corresponding edge may form a second painting composition 820.

The connection of the edge may be performed in consideration of edge characteristic information (the thickness of an edge, color attributes near an edge, the direction of an edge, etc.). When the edge characteristic information is included in a similar range, it may be determined that there is connectivity even when a connection between edges is broken. In this case, a connection can be made between the edges.

The entire composition of the painting may be extracted based on the first painting composition 810 and the second painting composition 820, and the painting composition information may be acquired. For example, the first painting composition 810 and the second painting composition 820 may be simplified to images of the most similar features. The first painting composition 810 may be simplified to images of the most similar features such as a square and the second painting composition 820 may be simplified to images of the most similar features such as a circle and a triangle.

The painting composition information may be expressed as one composition spectrum 830. For example, a first weight for the first painting composition 810 and a second weight for the second painting composition 820 are set to be different, and a composition spectrum 830 according to the similarity for each figure may be formed.

For example, the composition spectrum may be formed in the order of straight line, parallel line, cross, triangle, square, pentagon, hexagon, octagon, circle, ellipse, etc., and information on which composition has a high proportion on the painting may be expressed proportionally. For example, when the first painting composition 810 is a triangle, the proportion of the composition spectrum 830 corresponding to the triangle may have a relatively great value.

The painting composition information may be expressed based on the proportion of the figure forming the composition spectrum 830.

Figure 9:
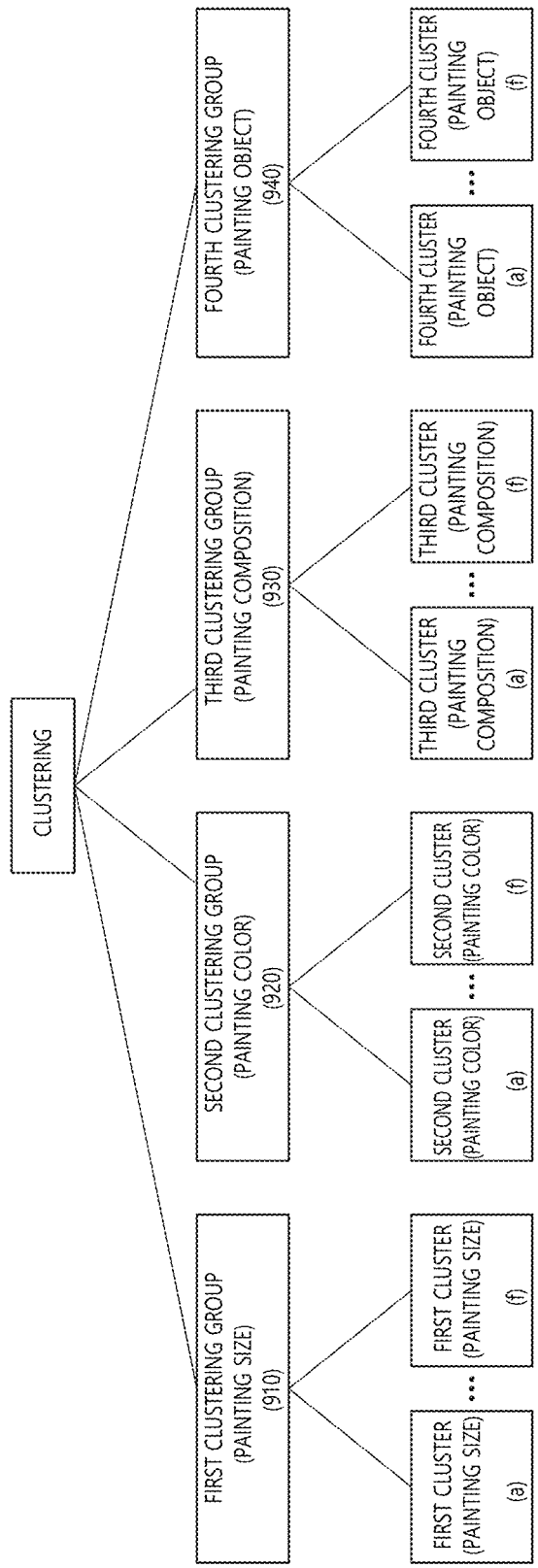
FIG. 9 is a conceptual diagram showing a sub-cluster-based clustering method according to an embodiment of the present invention.

FIG. 9 is a conceptual diagram showing a sub-cluster-based clustering method according to an embodiment of the present invention.

In FIG. 9, sub-clusters for each of a plurality of pieces of painting attribute sub-information, such as painting size information, painting color information, painting composition information, and painting object information, are disclosed.

Referring to FIG. 9, a first cluster group (painting size) 910 obtained through clustering based on only a painting size, a second cluster group (painting color) 920 obtained through clustering based on only a painting color, a third cluster group (painting composition) 930 obtained through clustering based on only a painting composition, and a fourth cluster group (paining object) 940 obtained through clustering based on only a painting object may be formed.

The first cluster group (painting size) 910 may include first clusters (painting size) obtained through clustering based on a painting size, such as the width and the height of a painting.

The second cluster group (painting color) 920 may include second clusters (painting color) obtained through clustering based on painting color spectra included in the painting color information. When the color spectra are similar, the colors may be included in the same cluster.

The third cluster group (painting composition) 930 may include third clusters (painting composition) obtained through clustering based on composition spectra included in the painting composition information. When the composition spectra are similar, the compositions may be included in the same cluster.

The fourth cluster group (painting object) 940 may include fourth clusters (painting object) obtained through clustering based on objects included in the painting. When the objects determined to be included in the painting are similar, the objects may be included in the same cluster.

Based on these individual clusters, recommended painting information suitable for a purchaser's preference may be determined.

Figure 10:
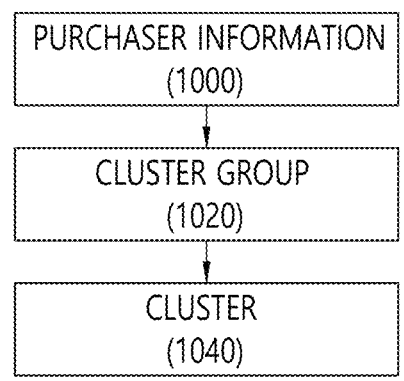
FIG. 10 is a conceptual diagram showing a method of determining recommended painting information on the basis of purchaser information according to an embodiment of the present invention.

FIG. 10 is a conceptual diagram showing a method of determining recommended painting information on the basis of purchaser information according to an embodiment of the present invention.

In FIG. 10, a method of determining recommended painting information on the basis of individual clusters for each piece of purchaser information and each piece of painting attribute sub-information is disclosed.

Referring to FIG. 10, the degree of relevance between the purchaser information 1000 and each individual cluster may be determined.

For example, it may be supposed that a purchaser wants a small warm painting. In this case, "small" and "warm" may be extracted as purchaser information. In this case, "small" may be extracted as first purchaser preference sub-information, and "warm" may be extracted as second purchaser preference sub-information. A search for the best cluster may be performed.

A clustering group 1020 corresponding to the purchaser preference sub-information included in the purchaser information 1000 may be determined. For example, a clustering group 1020 having a high degree of relevance to the first purchaser preference sub-information (small) may be determined among first to fourth clustering groups. The first purchaser preference sub-information (small) may have a high degree of relevance to the first clustering group 1020. A clustering group 1020 having a high degree of relevance to the second purchaser preference sub-information (warm) may be determined among the first to fourth clustering groups. The second purchaser preference sub-information (warm) may have a high degree of relevance to the second clustering group and the fourth clustering group. A clustering group 1020 to which purchaser preference information corresponds may be determined through learning based on a dataset including a painting and painting commentary information for expressing the painting.

After the clustering group 1020 to which the purchaser preference sub-information corresponds is determined, a search of the corresponding clustering group 1020 for a cluster corresponding to the purchaser preference sub-information may proceed.

For example, in the first cluster group (painting size) 1020, the first purchaser preference sub-information (small) may correspond to a first cluster (painting size) (a) and a first cluster (painting size) (b) corresponding to a painting determined as a small painting through a learning result and a painting determined as a small painting by previous purchasers. The range of first clusters matched to the determination of "small" may be continuously changed by the learning result based on feedback/selection of the purchaser.

The evaluation of the size of each cluster (painting size) 1040 may be made in various expressions through size feedback by learners and purchasers for the painting included in the corresponding cluster (painting size) 1040, and when the evaluation exceeds a threshold percentage, the corresponding evaluation may be matched to the corresponding cluster (painting size) 1040.

Also, in the second cluster group (painting color), the second purchaser preference sub-information (warm) may correspond to a second cluster (painting color) (a) 1040 and a second cluster (painting color) (b) 1040 corresponding to a painting determined as a warm painting through a learning result and a painting determined as a warm painting by previous purchasers. The range of second clusters 1040 matched to the determination of "warm" may be continuously changed by the learning result based on feedback/ selection of the purchaser.

The evaluation of the color of each cluster (painting color) 1040 may be made in various expressions through color feedback by learners and purchasers for the painting included in the corresponding cluster (painting color) 1040, and when the evaluation exceeds a threshold percentage, the corresponding evaluation may be matched to the corresponding cluster (painting color) 1040.

In this way, paintings matched to the purchaser information may be extracted from a plurality of cluster groups 1020, and a recommended painting may be determined in descending order of repetition among the paintings matched to the purchaser information and extracted from the plurality of cluster groups 1020. For example, when a painting A is a painting that is matched to the purchaser information and that is extracted in common from the first cluster group, the second cluster group, the third cluster group, and the fourth cluster group and a painting B is a painting that is matched to the purchaser information and that is extracted from the first cluster group and the second cluster group, the painting A is a recommended painting with higher priority than the painting B.

A plurality of recommended paintings are listed in order of priority. An artist of a recommended painting having a relatively high priority (within a set threshold rank) and/or a recommended painting having a common artist among the plurality of recommended paintings may be determined as recommended artist information, and a recommended painting having a relatively high priority (e.g., within a set threshold rank) among the plurality of recommended paintings may be determined as recommended painting image information.

According to the present invention, it is possible to recommend an artwork suitable for a purchaser's preference on the basis of artificial intelligence.

Also, according to the present invention, it is possible to provide a service for selling and purchasing artworks in a reverse auction method between a purchaser and an artist who is highly related to an artwork that is suitable for the purchaser's preference and that is selected based on artificial intelligence.

The embodiments according to the invention as described above may be implemented in the form of program instructions that can be executed by various computer components, and may be recorded on a computer-readable recording medium. The computer-readable recording medium may include program instructions, data files, data structures, and the like alone or in combination. The program instructions recorded on the computer-readable recording medium may be specially designed and configured for the present invention or may be publicly known and available to those skilled in the field of computer software. Examples of the computer-readable recording medium include magnetic media such as a hard disk, a floppy disk, and a magnetic tape, optical media such as a compact disc-read only memory (CD-ROM) and a digital versatile disc (DVD), magneto-optical media such as a floptical disk, and hardware devices such as a read-only memory (ROM), a random access memory (RAM), and a flash memory, which are specially configured to store and execute program instructions. Examples of the program instructions include not only machine language code generated by a compiler, but also high-level language code executable by a computer using an interpreter or the like. Hardware devices may be changed to one or more software modules to perform processing according to the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. An artificial intelligence-based curating method comprising operations of:

receiving, by an artificial intelligence curating device, purchaser information;

determining, by the artificial intelligence curating device, recommended painting information on the basis of the purchaser information and clustering performed on painting images of recommended paintings, the clustering including generating a group of paintings having similar attributes including painting color information, the recommended painting information including recommended painting image information and recommended artist information;

dividing, by the artificial intelligence curating device, the painting images into sub-regions;

determining, by the artificial intelligence curating device, color information for the sub-regions of the painting image;

considering, by the artificial intelligence curating device, a weight for each region in the painting;

contacting, by the artificial intelligence curating device, one or more artists based on the recommended artist information for a reverse auction;

receiving, by the artificial intelligence curating device, candidate sale painting information (artist) including at least offer prices for candidate sale paintings from the one or more artists;

generating, by the artificial intelligence curating device, candidate sale painting information (artificial intelligence) based on the recommended painting image information; and transmitting, by the artificial intelligence curating device, the candidate sale painting information (artist) and the candidate sale painting information (artificial intelligence) to a user device of the purchaser on the basis of the recommended painting information;

displaying on the user device, by the artificial intelligence curating device, status of the reverse auction including a number of offers from the artists received, receiving, by the artificial intelligence curating device, a purchase selection including an acceptance of an offer price for a candidate sale painting; and performing, by the artificial intelligence curating device, a payment procedure for the purchase, wherein the recommended painting information and the candidate sale painting information are determined based on the painting color information and painting composition information, the painting color information is determined based on color sensitivity and colors, sizes, and positions of a plurality of painting image sub-regions obtained through division based on the color sensitivity, and the painting composition information is determined based on edge determination sensitivity, a first painting composition determined through connection of main edges among a plurality of edges extracted based on the edge determination sensitivity, and a second painting composition determined based on an inner region formed through connection remaining edges other than the main edges.

2. The artificial intelligence-based curating method of claim 1, wherein the color sensitivity is determined based on the number of colors used in a painting and based on reference color sensitivity, the color of each of the plurality of painting image sub-regions corresponds to a median or an average of a color range of the corresponding one of the plurality of painting image sub-regions, the size of each of the plurality of painting image sub-regions is related to an area occupied by the corresponding one of the plurality of painting image sub-regions out of a total area of the painting, the position of each of the plurality of painting image sub-regions is related to a distance between the center of the painting and the center of the corresponding one of the plurality of painting image sub-regions, and the painting color information determined based on a color spectrum in which as a distance between the center of the painting and the center of each of the plurality of painting image sub-regions decreases, the color of the corresponding one of the plurality of painting images sub-regions is set to have a relatively increased proportion.

3. The artificial intelligence-based curating method of claim 2, wherein the edge determination sensitivity is sensitivity of determining which of a plurality of lines existing in the painting is an edge, the main edge is an edge having connectivity among the plurality of edges and having an inner region that is formed through connection to occupy at least a first critical percentage of the total area of the painting, the connection is performed based on edge characteristic information, and the edge characteristic information includes information regarding an edge thickness, color characteristics near an edge, or an edge direction.

4. The artificial intelligence-based curating method of claim 3, wherein the purchaser information is input based on a chatbot.

5. The artificial intelligence-based curating method of claim 1, wherein the attributes include a plurality of pieces of painting attribute sub-information and wherein a plurality of individual clusters of each piece of painting attribute sub-information are determined based on the recommended painting image information.

6. The artificial intelligence-based curating method of claim 5, wherein the recommended painting information is determined by matching the purchaser information to the plurality of pieces of painting attribute sub-information on the basis of the plurality of individual clusters.

7. The artificial intelligence-based curating method of claim 5, wherein the painting attribute sub-information include at least one of painting size information, the painting color information, the painting composition information and painting object information.

8. The artificial intelligence-based curating method of claim 5, wherein the clustering includes sub-clusters for each piece of painting attribute sub-information.

9. The artificial intelligence-based curating method of claim 8, wherein the sub-clusters include at least one of a first cluster group including first clusters obtained through clustering based on a painting size, a second cluster group including second clusters obtained through clustering based on painting color spectra included in the painting color information, a third cluster group including third clusters obtained through clustering based on composition spectra included in the painting composition information, and a fourth cluster group including fourth clusters obtained through clustering based on objects included in painting.

10. An artificial intelligence curating device comprising:
a communication unit configured to receive purchaser information; and a processor operatively connected to the communication unit, wherein the processor is implemented to receive the purchaser information, determine recommended painting information on the basis of the purchaser information and clustering performed on painting images of recommended paintings, the clustering including generating a group of paintings having similar attributes including painting color information, the recommended painting information including recommended painting image information and recommended artist information, divide the painting images into sub-regions, determine color information for the sub-regions of the painting image, consider a weight for each region in the painting, contact one or more artists based on the recommended artist information for a reverse auction, receive candidate sale painting information (artist) including at least offer prices for candidate sale paintings from the one or more artists, generate candidate sale painting information (artificial intelligence) based on the recommended painting image information, transmit candidate sale painting information to a user device of a purchaser on the basis of the recommended painting information, display on the user device status of the reverse auction including a number of offers from the artists received, receive a purchase selection including an acceptance of an offer price for a candidate sale painting; and perform a payment procedure for the purchase, wherein the recommended painting information and the candidate sale painting information are determined based on the painting color information and painting composition information, the painting color information is determined based on color sensitivity and colors, sizes, and positions of a plurality of painting image sub-regions obtained through division based on the color sensitivity, and the painting composition information is determined based on edge determination sensitivity, a first painting composition determined through connection of main edges among a plurality of edges extracted based on the edge determination sensitivity, and a second painting composition determined based on an inner region formed through connection remaining edges other than the main edges.

11. The artificial intelligence curating device of claim 10, wherein the color sensitivity is determined based on the number of colors used in a painting and based on reference color sensitivity, the color of each of the plurality of painting image sub-regions corresponds to a median or an average of a color range of the corresponding one of the plurality of painting image sub-regions, the size of each of the plurality of painting image sub-regions is related to an area occupied by the corresponding one of the plurality of painting image sub-regions out of a total area of the painting, the position of each of the plurality of painting image sub-regions is related to a distance between the center of the painting and the center of the corresponding one of the plurality of painting image sub-regions, and the painting color information determined based on a color spectrum in which as a distance between the center of the painting and the center of each of the plurality of painting image sub-regions decreases, the color of the corresponding one of the plurality of painting images sub-regions is set to have a relatively increased proportion.

12. The artificial intelligence curating device of claim 11, wherein
the edge determination sensitivity is sensitivity of determining which of a plurality of lines existing in the painting is an edge,
the main edge is an edge having connectivity among the plurality of edges and having an inner region that is formed through connection to occupy at least a first critical percentage of the total area of the painting,
the connection is performed based on edge characteristic information, and
the edge characteristic information includes information regarding an edge thickness, color characteristics near an edge, or an edge direction.

13. The artificial intelligence curating device of claim 10, wherein
the candidate sale painting information (artificial intelligence) is determined based on the recommended painting image information and the recommended artist information, and
the purchaser information is input based on a chatbot.

14. The artificial intelligence curating device of claim 10, wherein the attributes include a plurality of pieces of painting attribute sub-information and wherein a plurality of individual clusters of each piece of painting attribute sub-information are determined based on the recommended painting image information.

15. The artificial intelligence curating device of claim 14, wherein the recommended painting information is determined by matching the purchaser information to the plurality of pieces of painting attribute sub-information on the basis of the plurality of individual clusters.

16. The artificial intelligence curating device of claim 14, wherein the painting attribute sub-information includes at least one of painting size information, the painting color information, the painting composition information and painting object information.

17. The artificial intelligence curating device of claim 14, wherein the clustering includes sub-clusters for each piece of painting attribute sub-information.

18. The artificial intelligence curating device of claim 17, wherein the sub-clusters include at least one of a first cluster group including first clusters obtained through clustering based on a painting size, a second cluster group including second clusters obtained through clustering based on painting color spectra included in the painting color information, a third cluster group including third clusters obtained through clustering based on composition spectra included in the painting composition information, and a fourth cluster group including fourth clusters obtained through clustering based on objects included in painting.

* * * * *